2,996,495
WOOD EXTRACTION

John E. Reese, deceased, late of St. Simons Island, Ga., by Ardelia C. Reese, sole heir, St. Simons Island, Ga., assignor to Hercules Powder Company, Wilmington, Del., a corporation of Delaware
No Drawing. Filed Mar. 12, 1958, Ser. No. 720,823
4 Claims. (Cl. 260—110)

This invention relates to an extraction process and, more particularly, to an improved process for extracting resinous materials from wood.

In the recovery of rosin and other resinous materials from pine wood, it is common practice to extract the wood with a solvent. Numerous solvents, primarily aromatic hydrocarbons and ketones, have been proposed for this purpose.

It is important in the extraction of pine wood to extract as much of the valuable resinous materials as possible and the efficiency of a solvent is measured in terms of the amount of resinous materials it is capable of extracting from a given quantity of pine wood.

The present invention is based on the selective discovery that nitroalkanes having from 2 to 3 carbon atoms are especially efficient solvents for use in the extraction of rosin and other resinous materials from pine wood. The selective nature of the invention is shown by the fact that the nitroalkanes which are useful in the practice of the invention are limited by definition to three compounds, i.e., nitroethane, 1-nitropropane and 2-nitropropane. The lower homolog of these compounds, nitromethane, is excluded as unacceptable because the use of the latter compound results in an extract solution which forms an insoluble thermosetting precipitate that adheres to the walls of the evaporator. The higher homologs, such as the nitrobutanes, are excluded because they are too high boiling and less efficient.

In carrying out the process of the invention, pine wood chips, preferably from the southern long-leaf pine in the form of stump wood, root or "top" wood, are extracted with a nitroalkane having from 2 to 3 carbon atoms until extraction is substantially complete. The pine wood can be steamed before extraction with the nitroalkane or the extraction can be carried out without previous steaming of the wood. The nitroalkane removes from the pine wood rosin and other resinous materials and when the pine wood has not been previously steamed also removes turpentine and pine oil. The extraction solution is then distilled to remove the nitroalkane and turpentine and pine oil, if present, are also removed by distillation, leaving a residue of rosin and other resinous materials. The residue can then be refined into its constituents by well known procedures. It is particularly noteworthy that the extraction process of the invention produces a markedly increased yield of resinous materials in comparison with extraction processes employing as solvents the aromatic hydrocarbons which have been most commonly used heretofore in the extraction of pine wood.

The following table shows typical results which have been obtained in the batch extraction of pine wood chips (southern long-leaf pine) with the specified nitroalkanes in comparison with benzene. The wood extracted in each case contained 22% moisture and each extraction was carried out at atmospheric reflux temperature for 180 minutes at a solvent/fresh wood ratio of 2:1.

Table

| Solvent | Resinous Extract (lbs./ton of fresh wood) | Analysis of Extract | | |
|---|---|---|---|---|
| | | Acid No. | Drop Melting Point (° C.) | Percent Gasoline Insoluble |
| Benzene | 460 | 151 | 80 | 12.5 |
| Nitroethane | 490 | 146 | 83 | 17.8 |
| 2-Nitropropane | 483 | 151 | 79 | 15.6 |
| 1-Nitropropane | 483 | 151 | 82.5 | 16.7 |

In none of the above extractions was the distilling apparatus employed in removing the solvent from the extract found to be fouled. By contrast, however, the distilling apparatus employed in removing nitromethane from an extract obtained using the latter as solvent was coated with an insoluble precipitate.

In carrying out the process of the invention, any convenient conditions of pressure and temperature can be utilized. It is desirable, however, to carry out the extraction at a temperature ranging from about 80° C. to 175° C. and pressures ranging from atmospheric up to 125 p.s.i.g. For commercial practices, it is preferred to use temperatures of about 90–150° C. and pressures of 0–95 p.s.i.g. In general, the smaller the chip size of the pine wood, the more moderate may be the extraction conditions.

Of the three solvents that are employable in this invention, the preferred species is nitroethane, because of its slightly greater extraction efficiency and more convenient boiling point. However, the other solvents that are useful in the invention possess excellent extracting ability, desirably high vapor pressures, high flash points and low toxicity which make them advantageous to use in the process of the invention.

Unlike some of the prior art processes, the practice of the invention does not require that the pine wood have any particular moisture content or be milled to an impractically small size. The advantages of the invention can be obtained in the extraction of wood that contains up to about 30% moisture and is particularly useful on wood containing from 10 to 35% moisture. Notwithstanding this fact, however, it has been found that the spent wood produced as a by-product of the process has a lower moisture content than spent wood obtained by prior art processes and is more useful as a fuel.

The solvents employed in the invention, in addition to being highly efficient, possess higher penetrability than most prior art solvents and this permits extraction of wood having relatively large particle size. Consequently, grinding of the wood to the very small size sometimes essential in the art is not necessary and thereby savings in time and labor can be effected.

Still another advantage of the process over prior art processes resides in the refinability of the resinous materials extracted. Specifically, lighter color rosins are more easily obtainable when pine wood is extracted according to the invention. It has been found, for instance, that pine wood from certain localities when extracted with benzene does not produce light colored rosin products after normal refining. Using the process of the invention, however, light colored rosins can be obtained easily by conventional refining techniques.

The process of the invention can be utilized in either a batch or continuous operation and is suitable for countercurrent extraction techniques. In the latter type of operation, a quantity of wood is passed through a number of extraction stages and treated in each stage with a quantity of a nitroalkane having from 2 to 3 carbon atoms. The extract solutions are maintained separate from one another. The extract solution from the first stage is directly distilled following removal of any water layer present to recover solvent and resin. The extract solution from the second stage is used to extract resinous materials from the fresh batch of wood entering stage one and the extract solution from each of the remaining stages is used as the extractant in each immediately preceding stage. In the last stage, fresh nitroalkane is used as the extractant. In this manner maximum utilization of the extracting power of the nitroalkane is obtained in that the fresh nitroalkane contacts the wood containing the least resinous materials and solvent mixture having the least extracting power, i.e., richest in resinous materials, contacts wood richest in resinous materials. By operating in this manner, equilibrium conditions can be maintained and the most efficient use of solvent obtained.

Although it is preferred to carry out this invention using one of the specified nitroalkanes as the sole extractant, mixtures of the nitroalkanes can also be used effectively. In addition, the invention can be practiced using one of the specified nitroalkanes admixed with a lesser amount of another solvent such as benzene, acetone, toluene, etc. The added solvent in such instances should not be present in amounts large enough to diminish substantially the desirable attributes of the process of the invention.

What I claim and desire to protect by Letters Patent is:

1. In the process of recovering both rosin and gasoline-insoluble pine wood resinous materials from pine wood, the step comprising extracting the wood with a nitroalkane having from 2 to 3 carbon atoms at a temperature in the range of about 80° C. to 175° C. and a pressure ranging from atmospheric up to 125 p.s.i.g. and separating the extract from the wood.

2. The process of claim 1 in which the nitroalkane is nitroethane.

3. The process of claim 1 in which the nitroalkane is 1-nitropropane.

4. The process of claim 1 in which the nitroalkane is 2-nitropropane.

References Cited in the file of this patent

UNITED STATES PATENTS

| | | |
|---|---|---|
| 2,221,540 | Hall | Nov. 12, 1940 |
| 2,307,936 | Martin | Jan. 12, 1943 |
| 2,336,547 | Jones | Dec. 14, 1943 |
| 2,807,607 | Ridgway | Sept. 24, 1957 |

OTHER REFERENCES

Borgin: Industrial and Engineering Chemistry, vol. 34, pages 1091–6 (1942).